Patented Jan. 26, 1926.

1,570,891

UNITED STATES PATENT OFFICE.

HERMAN HEUSER, OF CHICAGO, ILLINOIS.

UTILIZING CORNCOBS.

No Drawing. Application filed March 22, 1923. Serial No. 626,903.

*To all whom it may concern:*

Be it known that I, HERMAN HEUSER, a citizen of the United States, residing at Chicago, in the county of Cook and State of Illinois, have invented a new and useful Improvement in Utilizing Corncobs, of which the following is a specification.

This invention relates to the utilization of vegetable waste products which are largely cellulosic in nature, and more particularly to the utilization of corn cobs.

I have found that by subjecting such vegetable waste products, and particularly corn cobs to enzymatic conversion, preferably both proteolytic and amylolytic in character, the food value of such waste products may be materially increased and the waste products themselves rendered available for use as animal food stuffs. In order to effect the enzymatic conversion I may employ enzymes derived from any suitable source; in general, however, I prefer to employ materials containing active enzymes, such as those to be found in germinating cereal grains, such as corn sprouts, wheat sprouts, oat sprouts and barley malt, these materials being employed either green or dried.

During the preparation of a food stuff from vegetable waste materials, such as corn cobs, in accordance with my process, I may introduce into the material a suitable culture of lactic acid bacteria in order to produce a moderate degree of lactic acid fermentation therein. The palatability of the material is thereby improved, as is also its nutritive value. I have further found that when so treated as to produce therein lactic acid fermentation in the manner described, the resulting food stuff may be employed as a constituent of silage and when so employed, it causes a material improvement in the character of the silage feed, tending to produce therein a better lactic acid fermentation than normally takes place.

In order that my invention may be clearly understood, it is described hereinafter more particularly with reference to the utilization of corn cobs. It may be mentioned here that the average protein content of corn cobs is about 2.40% but the digestible protein content is only about 0.50%. Furthermore, in the following description of a process embodying my invention, I have referred to malt as the enzyme containing material. It will be understood, however, that other enzyme containing materials such as germinating cereal sprouts may be substituted therewith in suitable proportions according to the more or less varying enzymatic activity of the selected material.

In carrying out the invention, corn cobs are cut or ground into small particles in any suitable manner and admixed with a suitable proportion of malt, either green or dried, the green malt being however, preferred. The resulting material contains the enzymes necessary for the breaking down of the indigestible portions of the corn cobs as hereinafter described and may be directly employed as a food stuff, enzymatic conversion of the various constituents of the corn cobs taking place within the body of the animal. In preparing a mixture for use in this manner, I may incorporate from 25 to 60% of green malt or from 15 to 35% of kilned malt, the quantity preferred being about 25% for kilned malt and about 35% for green malt.

In carrying out my invention, it is preferred that an enzymatic conversion of the constituents of the corn cob be effected before the mixture is fed to the animal. A mixture of corn cobs and malt, containing, for example, about 25% of kilned malt is placed in a closed vessel and sufficient hot water added to raise the temperature of the resulting mash to about 40° C. This temperature is maintained for about 4 to 6 hours, during which period the cytase and the proteolytic enzymes of the malt act to break down the cellular structure of the corn cobs and to convert the indigestible proteins present into a readily digestible form. After this conversion has been carried to a sufficient extent, the temperature of the mash is raised by the addition of hot water to a temperature of 66 to 70° C. at which temperature the diastatic activity of the malt is brought into play. The saccharification of the mixture is continued for at least one hour or until substantially complete and the mixture may then be made immediately available for use by drying in any suitable manner and grinding. As a result of the enzyme action, the digestible protein content of the corn cobs is very materially increased as is also the digestible carbohydrate content. From the tabulation hereinafter given, it will be seen that the food value of the mixture is very materially increased and a material proportion of the food constituents rendered available are derived from the corn cobs.

Instead of immediately drying the mash after the saccharification, I may inoculate it with a culture of lactic acid bacteria, the mash being first cooled to from 50 to 60° C. Initially a pure lactic acid bacterial culture may be employed. In subsequent operations the inoculation may be effected by the addition of a small amount of a starter in the form of a portion of a previous treated batch. After inoculation the mash is maintained at a temperature of 50 to 60° in order that the lactic acid fermentation may proceed with a minimum of butyric acid fermentation. The mash is maintained at this temperature until a sample of liquid portion of the mash shows a lactic acid content of 1% if it be desired to carry the acidity to that point. After this acidity has been reached the danger of butyric acid fermentation is greatly increased and the temperature of the mash may be permitted to drop 50° below C. The fermentation is continued until an acidity between 0.5 and 1.5% is obtained in liquid portion of the mash; the entire process continuing from 12 to 36 hours. During the lactic acid fermentation, an additional portion of the protein is converted to digestible form and the same is true with respect to the carbohydrate. Furthermore, the lactic acid fermentation converts into soluble form some of the inorganic salts present in the corn cobs more particularly the phosphatic compounds. The food elements necessary for the propagation for the lactic acid bacteria are formed in the corn cobs by the previous enzymatic conversion and in part by the food elements present in the malt.

After the lactic acid fermentation or saccharification is completed, the mash may be dried in any suitable manner. It is preferred that the drying be carried out at a low temperature, preferably not above 60° C. and in vacuo in order to maintain the virility of the lactic acid bacteria. The dried compound thus formed is a highly desirable food stuff from the standpoint of palatability, digestible food constituents, inorganic salts and roughage. It may be also added to silage as the latter is packed into a silo in proportions of say 15% upwards. When so employed, it serves to inoculate the silage with a virile culture of lactic acid bacteria, thereby tending to produce in the silage a rapid lactic acid fermentation with a reduced or substantially no butyric acid fermentation.

The following tabulation presents more clearly certain of the desirable results obtained by the use of my invention:

| Feeding stuffs | Digestible protein | Digestible carbohydrates | Digestible fat | Total nutriment per pound of feed | Nutritive ratio |
|---|---|---|---|---|---|
| | Per cent | | Per cent | | |
| Corncobs | 0.50 | 46.60 | 0.20 | 0.4755 | 1:94.10 |
| Barley malt | 7.60 | 64.60 | 1.90 | 0.7648 | 1:9.06 |
| Mixture of 75% corncobs 25% malt | 2.28 | 51.10 | 0.62 | 0.5478 | 1:23.02 |
| Enzyme-digested compound made with 75% corncobs, 25% malt | 3.25 | 55.60 | 0.75 | 0.6054 | 1:17.62 |
| Enzyme-and lactic acid digested compound made with 75% corncobs, 25% malt | 3.70 | 59.50 | 0.75 | 0.6489 | 1:16.53 |

Total nutriment=digestible protein plus digestible carbohydrates plus 2.25×digestible fat.

Nutritive ratio=digestible carbohydrates plus 2.25×digestible fat digestible protein.

In the foregoing table the higher total nutriment and the lower nutritive ratio the greater the food value of the compound. It is readily apparent that the corncobs alone are substantially valueless as food stuffs by reason of their very low total nutriment and very high nutritive ratio. The use of the mixture of corncobs and malt, even when not subjected to enzyme conversion, renders potentially available a much improved food product in that it brings into the alimentary tract of the animal the necessary constituents for the enzymatic conversion of the unavailable proteins and carbohydrates of the corncobs.

Although the present invention has been described in connection with the specific details of a process embodying the same, it is not intended that these details shall be regarded as limitations upon the scope of the invention except in so far as included in the accompanying claims.

I claim:

1. The method of preparing animal food stuffs from vegetable wastes such as corncobs which consists in incorporating therein a germinated cereal and producing in the mixture successive proteolytic and diastatic enzyme conversions.

2. The method of preparing animal food stuffs from vegetable wastes such as corncobs which consists in incorporating therewith a germinating cereal and producing in the mixture in succession proteolytic and diastatic enzyme conversions and lactic acid fermentation.

3. The method of preparing animal food stuffs from vegetable wastes such as corncobs which consists in incorporating therein not less than 10% of malt and producing in the mixture successive proteolytic and diastatic enzyme conversions.

4. The method of preparing animal food stuffs from vegetable wastes such as corncobs which consists in incorporating therewith not less than 15% of malt and producing in the mixture in succession proteolytic and diastatic enzyme conversions and lactic acid fermentation.

5. The method of preparing animal food stuffs from vegetable waste such as corncobs which consists in incorporating therewith at least 10% of malt, adding sufficient hot water thereto to form a mash having a temperature of about 40° C., maintaining this temperature to permit the action of the mash to 66 to 70° C. and maintaining this temperature to saccharify the mash, and producing in the mash a lactic acid fermentation until the acidity thereof is from 0.5 to 1.5%.

6. A method of preparing silage which consists in inoculating the silage with a virile lactic acid culture.

7. A method of preparing silage which consists in introducing into the silage the product of enzymatic conversion of mixture of corncobs and germinated cereal containing virile lactic acid bacteria.

8. A food stuff consisting of a mixture of corncobs and germinated cereal containing products of proteolytic and amylolytic enzyme conversion of the former.

9. A food stuff consisting of a mixture of corncobs and germinated cereal containing products of proteolytic and amylolytic conversion of the former and inoculated with lactic acid bacteria.

10. A food stuff consisting of a mixture of corncobs and at least 10% of malt containing products of proteolytic and amylolytic conversion of the former and inoculated with lactic acid bacteria.

11. As a food stuff, a lactic acid fermented mixture of corncobs and germinated cereal containing proteolytic and amylolytic enzyme conversion products of the former having an acidity between 0.5 and 1.5%.

12. As a food stuff, a lactic acid fermented mixture of corncobs and malt containing proteolytic and amylolytic enzyme conversion products of the former having an acidity between 0.5 and 1.5%.

HERMAN HEUSER.